April 26, 1938.
J. A. SWEENEY ET AL
2,115,594
DRAFT CONTROL FOR LEHRS
Filed March 22, 1937
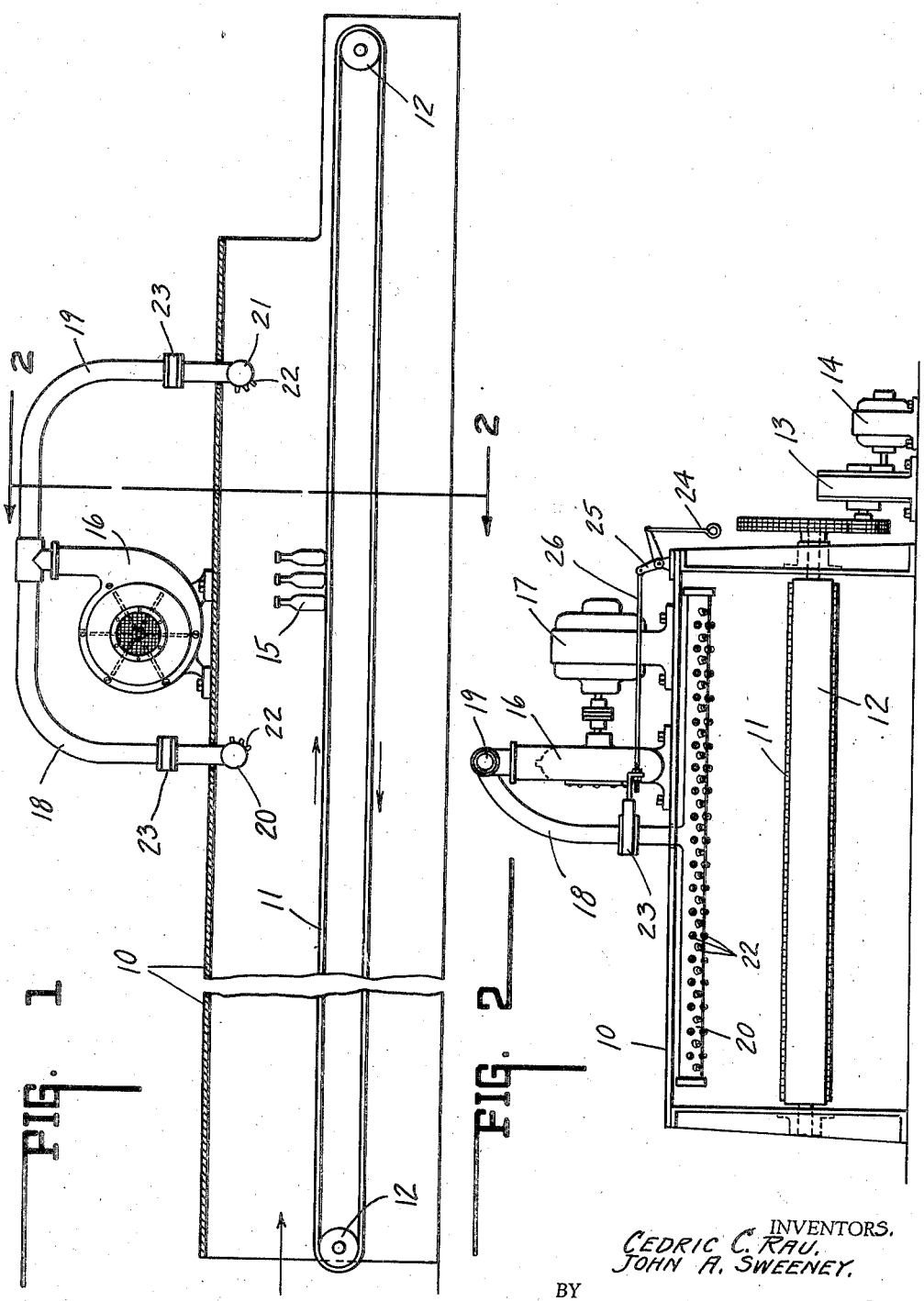
INVENTORS.
CEDRIC C. RAU.
JOHN A. SWEENEY.
BY
Lockwood Goldsmith & Galt
ATTORNEYS.

Patented Apr. 26, 1938

2,115,594

UNITED STATES PATENT OFFICE 2,115,594

DRAFT CONTROL FOR LEHRS

John A. Sweeney and Cedric C. Rau, Indianapolis, Ind., assignors to Fairmount Glass Works, Inc., Indianapolis, Ind., a corporation Application March 22, 1937, Serial No. 132,198

2 Claims. (Cl. 49—47)

This application relates to tempering lehrs for bottles or similar glassware, and particularly with respect to controlling the draft or air currents passing through the tunnel of the lehr.

In tempering lehrs of the tunnel type, the glassware is slowly conveyed from one end to the other on an endless conveyor belt, the temperature gradually decreasing from the intake to the discharge end. It is extremely important to the quality of the glassware that the temperature throughout the length of the lehr be gradually decreased and to that end temperature readings of various sections throughout the lehr are periodically taken to the end that the graduated heat may be properly controlled. By reason of the character and construction of such lehrs wherein they are of considerable length and tunnel-like, and wherein the heat applied to the glassware is in the form of hot air, difficulty is had with drafts through the lehr which upsets the heat control and disturbs the tempering action to the extent that much of the ware is lost through bad tempering when atmospheric conditions are such that a strong draft occurs. Such drafts are usually brought about by atmospheric conditions due to the fact that the buildings in which lehrs are located need to be well ventilated and have open doors, windows or other ventilating openings. This permits outside air currents to cause drafts through the lehr which adversely affects the heat control. Attempt has heretofore been made to shield the interior of the lehr from such drafs by the use of curtains, but such curtains cannot extend below the tops of the ware passing through the lehr and, therefore, are largely ineffective.

The object of this invention is to provide a lehr with a high pressure area, preferably adjacent the cooling or discharge end. Such high pressure area has the effect of a dam or obstruction to the passage of air currents or drafts therethrough, and since the high pressure may extend in and about the ware and from top to bottom of the lehr, it may be made completely effective. Such high pressure area may be obtained by discharging into the lehr opposed air currents from a suitable blower or fan, the opposed air currents raising the air pressure therebetween so as to prevent passage of air currents through the area. By preventing the passage of air currents through a small area in the lehr, the remainder thereof will be protected from air current so that the entire length of the tunnel will contain dead air, subject to more accurate heat control.

One way of accomplishing the above is to provide the lehr adjacent the discharge end with a pair of air discharge nozzles directed toward each other and slightly spaced apart, said nozzles communicating with a blower or fan for forcing the air through the nozzles to provide a high pressure area. Suitable valves are provided for controlling the passage of air through the nozzles so as to compensate, if necessary, for variations in air pressures at the opposed ends of the lehr, caused by exterior drafts. Thus, if the external atmospheric pressure is such as to normally induce a draft from the dicharge to the intake ends, the air discharge from the nozzles will be so controlled that the high pressure area may be effected through the opposed forces of air currents as between such nozzle and normal draft.

The full nature of the invention will be understood from the accompanying drawing and the following description and claims:

Fig. 1 is a central vertical section through the lehr showing the draft control mounted thereon.
Fig. 2 is a section taken on the line 2—2 of Fig. 1.

In the drawing there is shown a lehr of the conventional type comprising a long tunnel-like housing 10 in which an endless belt conveyor 11 is caused to slowly move. The conveyor 11 is supported upon the rollers 12, one of which is driven through the reduction gears 13 by a motor 14. The ware, herein shown as bottles 15, is slowly conveyed upon the conveyor 11 from the intake to the discharge end. Both ends of the lehr are open to atmospheric conditions, although the interior of the lehr is heated by suitable means, not shown herein, so that the intake end will be highly heated to receive the ware directly from the forming machines. Intermediate the heated intake end and the cool discharge end, burners or suitable heat control mediums are employed to control the heat of the air surrounding the bottles at different sections throughout the length of the lehr. Thus, the temperature within the lehr is gradually reduced from a high temperature at the intake end to atmospheric temperature at the discharge end. It is the purpose of the lehr to maintain as nearly as possible a constant reduction in temperature for properly tempering the ware as it passes therethrough.

For creating the high pressure area there is mounted upon the lehr a blower 16 of any suitable character driven by a motor 17. Connected with the blower there are oppositely-directed conduits 18 and 19 extending downwardly into the lehr in spaced relation and in communication with the oppositely-disposed headers 20 and 21. The headers extend lengthwise throughout the width of the lehr, are positioned to clear the top of the ware 15 passing therethrough, and are provided with air discharge nozzles 22 for directing air currents longitudinally of the lehr and toward each other. Oppositely directed air currents are, therefore, set up between the headers which offset each other to provide the high pressure area acting as a dam or obstruction to the passage of any naturally induced draft or air current through the lehr.

It is necessary to control the discharge of air from the headers in order that the air directed therefrom into the lehr and the pressure of the area may be just sufficient and so directed as to counter-balance naturally induced drafts. For this purpose there is provided a gate valve 23 in each conduit which is controlled from the side of the lehr through a control lever 24 operating through a bell crank 25 and connecting rod 26.

From the above it will be noted that through the manipulation of the valves 23 any naturally induced air draft in the lehr may be effectively neutralized by the air discharged from one or both headers.

The invention claimed is:

1. A lehr for tempering ware having a tunnel-like housing, a ware conveyor movable therethrough, and means for artificially inducing oppositely-disposed air currents into said lehr for setting up a high pressure dead air area therein to prevent passage therethrough of any naturally induced air current.

2. A lehr for tempering ware having a tunnel-like housing, a motor-driven blower associated with said housing, oppositely-disposed air discharge units connected with said blower and mounted in opposed relation within said housing for artificially inducing oppositely-directed air currents into said lehr to set up a high pressure area to prevent the passage therethrough of any naturally induced air current, and valves for controlling passage of air through said units to effect stabilization of air currents.

JOHN A. SWEENEY.
CEDRIC C. RAU.